Figure 1:
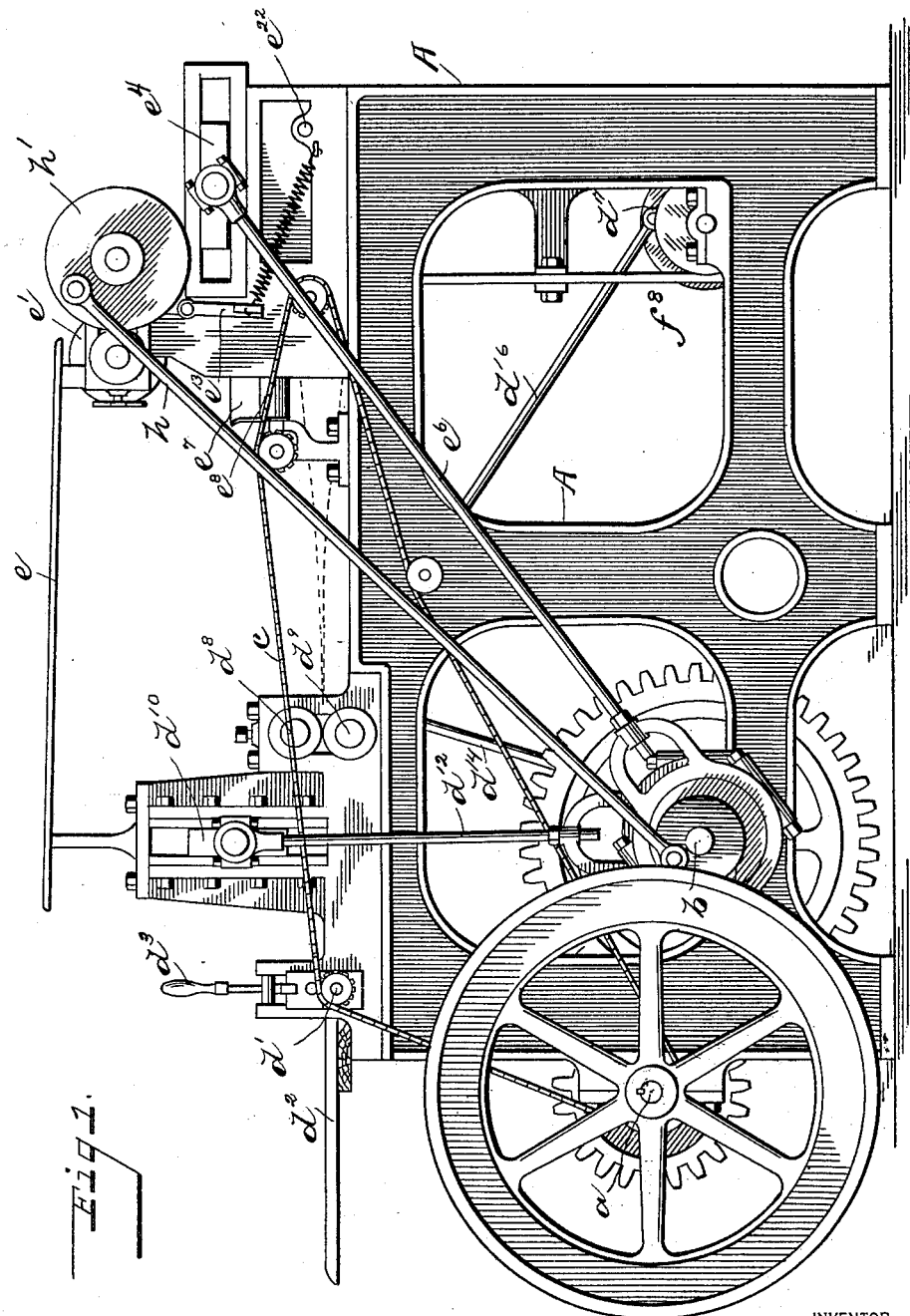

No. 722,329. PATENTED MAR. 10, 1903.
W. B. SHEPERD.
MACHINE FOR MAKING CELL CASES OR EGG TRAYS.
APPLICATION FILED AUG. 7, 1902.
NO MODEL. 6 SHEETS—SHEET 1.

WITNESSES: INVENTOR

No. 722,329. PATENTED MAR. 10, 1903.
W. B. SHEPERD.
MACHINE FOR MAKING CELL CASES OR EGG TRAYS.
APPLICATION FILED AUG. 7, 1902.
NO MODEL. 6 SHEETS—SHEET 2.
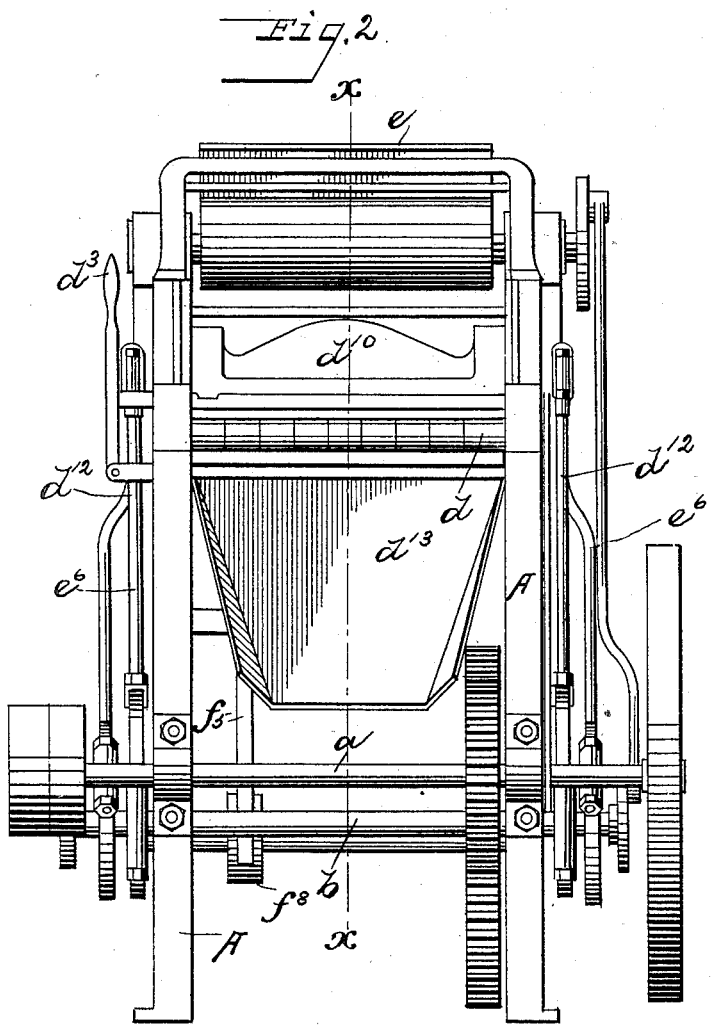

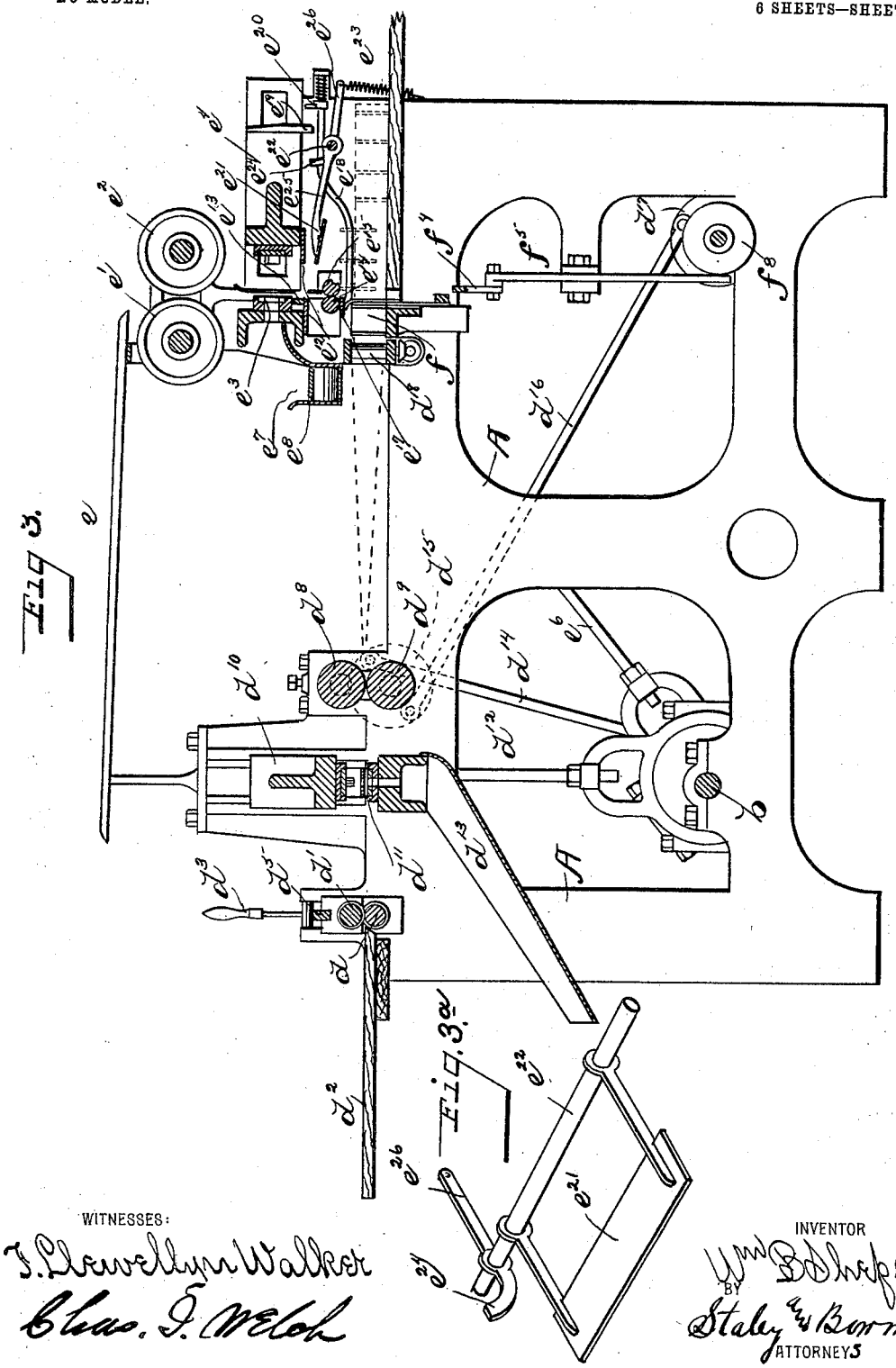

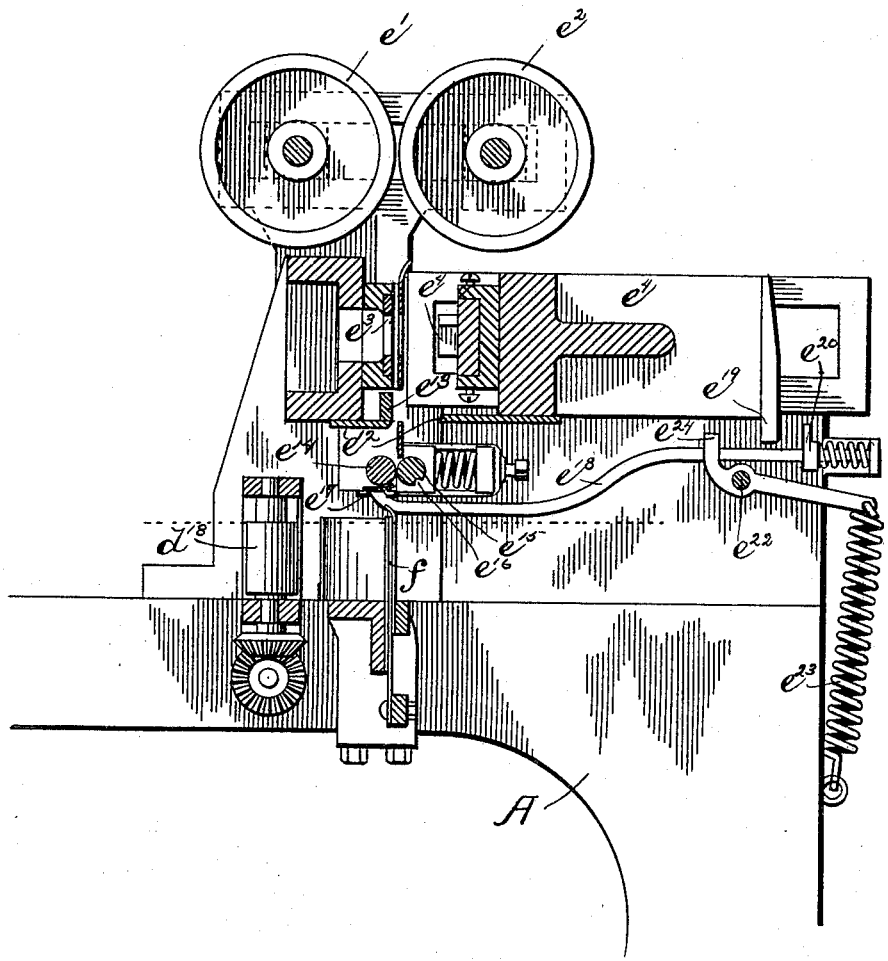

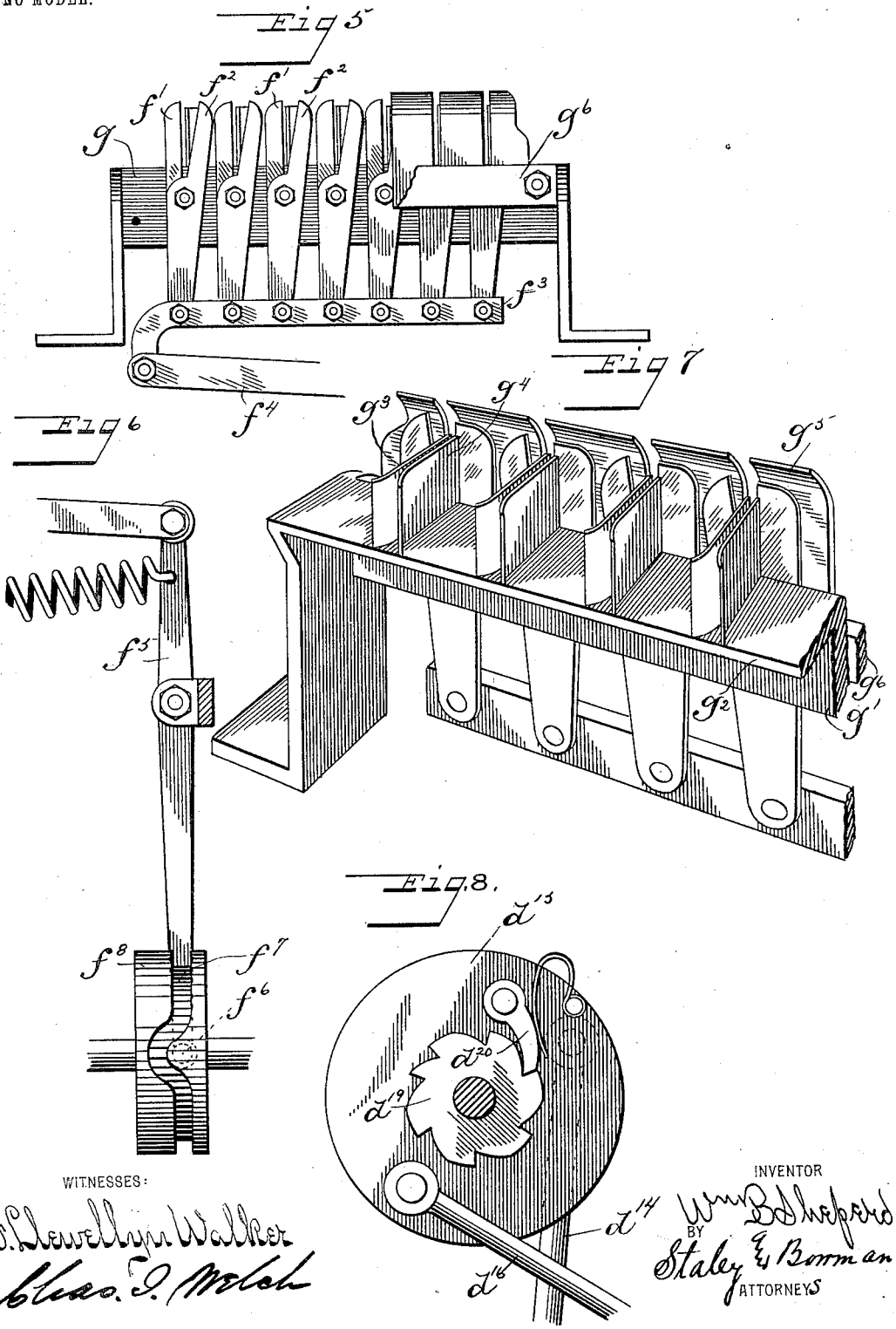

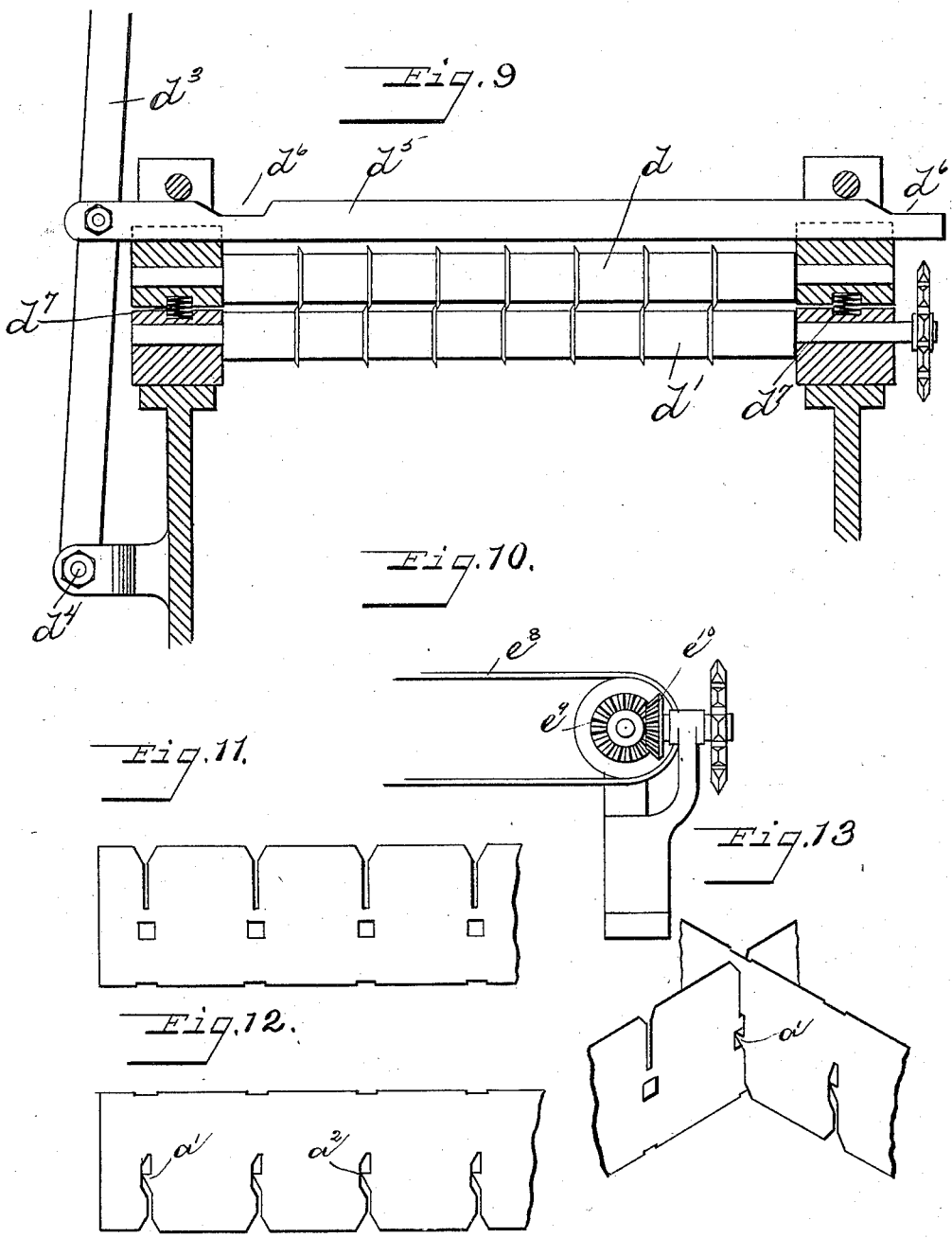

UNITED STATES PATENT OFFICE.

WILLIAM B. SHEPERD, OF URBANA, OHIO, ASSIGNOR OF ONE-HALF TO H. CRAIG, OF URBANA, OHIO.

MACHINE FOR MAKING CELL-CASES OR EGG-TRAYS.

SPECIFICATION forming part of Letters Patent No. 722,329, dated March 10, 1903.

Application filed August 7, 1902. Serial No. 118,834. (No model.)

*To all whom it may concern:*

Be it known that I, WILLIAM B. SHEPERD, a citizen of the United States, residing at Urbana, in the county of Champaign and State of Ohio, have invented certain new and useful Improvements in Machines for Making Cell-Cases or Egg-Trays, of which the following is a specification.

My invention relates to machines for the manufacture of cell-cases and egg-trays; and the object of my invention is to provide a simple and efficient machine for the manufacture of cell-cases and egg-trays by means of which the strawboard or other material from which the cases are to be made can be fed continuously from a roll properly cut and punched to form the partitions and the parts all joined together to form the cell-cases and separated into cases or trays of uniform size and discharged from the machine without hand manipulation.

A further object of my invention is to provide novel mechanism by means of which the strips which form the longitudinal partitions shall be punched in continuous strips to receive the transverse partitions, the cross-partitions being punched and cut successively of the proper length to engage the longitudinal strips.

A further object of the invention is to provide a novel arrangement for feeding the cross-partitions, by means of which the web of material from which they are formed is securely held in a fixed position at all times while being punched and severed and as soon as severed immediately forced forward into proper engagement with the longitudinal partitions.

A further object of my invention is to improve upon the various mechanical constructions, the details of which will be more fully pointed out hereinafter.

In the accompanying drawings, which form a part of this specification, Figure 1 is a side elevation of my machine. Fig. 2 is a rear elevation. Fig. 3 is a central longitudinal sectional view along the line $xx$ of Fig. 2. Fig. $3^a$ is a detail of the beater. Fig. 4 is a sectional view of the feeding and punching mechanism for the cross-strips, the beater $e^{21}$ being omitted. Fig. 5 is a detail view of the shears for cutting mechanism of the longitudinal strips. Fig. 6 is a detail of the mechanism for operating the shears, broken away in part. Fig. 7 is a detail of the guide and shears for the longitudinal strips. Fig. 8 is a detail of the pawl-and-pinion mechanism for varying the movement of the feeding devices. Fig. 9 is a sectional view of the feeding and cutting rolls for the web of the longitudinal strips. Fig. 10 is a detail view of the mechanism for removing waste particles. Figs. 11, 12, and 13 are views of longitudinal and transverse strips, showing the perforations made by the punches.

Like parts are represented by similar letters of reference in the several views.

The general operation of my machine is by advancing the webs from which the longitudinal and cross strips are formed into the machine, supporting-plates for said webs being placed one above the other. The web of the longitudinal strips is first passed through mechanism for cutting the web into longitudinal strips, and the strips are afterward punched and fed forward until raised from a flat position to a vertical position. After the longitudinal strips have been fed forward into a vertical position they pass under the mechanism for feeding, punching, and cutting the cross-strips from the other webs of material, and the cross-strips are entirely severed from the web before they are fed into position for being assembled with the longitudinal strips for forming the case. The longitudinal strips are cut in proper lengths at a point approximately in line with the cutting and guiding mechanism for the cross-strips, insuring thereby a uniform and accurate size for the cases, and the construction of the parts is such that the cross-strips are firmly forced into position.

A A represent the frame of the machine, on which is supported the driving-shaft $a$, which in the drawings is shown as being operated by a belt. The main operating-shaft $b$ is connected to the driving-shaft by gears, as shown in Fig. 1. A sprocket-chain $c$ connects the driving-shaft with rotary cutters $d\,d'$. The web of strawboard for the longitudinal strips is fed into the machine on the operating platform or base, (marked $d^2$.) In order to facilitate the feeding of the web into the machine, I have shown the rotary cutters adjustably mounted, so that the operator can raise and lower the upper roller for the purpose of inserting the webs. This is done by means of the lever $d^3$, which is pivoted to the frame of the machine at $d^4$. A sliding bar $d^5$ is formed with notches $d^6$, as shown in Fig. 6, so that when the lever is pushed in one direction the upper roll will be raised and in the opposite direction the same will be lowered. Springs $d^7$ are for holding the upper rotary cutter normally out of adjustment with the lower cutter.

The web of strawboard after it is pulled between the cutting-rolls extends underneath the punching mechanism, and the end of the same is placed between the two feed-rolls $d^8$ and $d^9$. After the feed-rolls have begun to advance the strip the lever $d^3$ is moved until the upper rotary cutter is in proper adjustment with the lower cutter, and thereby the web is cut into longitudinal strips.

The punching mechanism consists of male and female dies $d^{10}$ $d^{11}$, and the upper die of the punching mechanism has a connecting-rod $d^{12}$ joined thereto, connecting it with the main operating-shaft $b$. The waste particles are conveyed away from the punching mechanism by an inclined channel $d^{13}$. The lower feed-roll $d^9$ is operated by a connecting-rod $d^{14}$, extending from the main operating-shaft $b$ to the disk-crank $d^{15}$, journaled loosely on the shaft with said feed-roll. Another connecting-rod $d^{16}$ extends from the disk-crank $d^{15}$ to a disk-crank $d^{17}$, journaled on a shaft in the lower part of the machine, thereby operating a grooved pulley hereinafter referred to. The longitudinal webs having been cut into longitudinal strips by the rotary cutters and the strips having been punched by the punching mechanism, they are advanced along the supporting-bed until turned from a flat or horizontal position to a vertical position by means of a roller $d^{18}$, which is revolved by the sprocket-chain $c$. (Shown in Fig. 1.)

The mechanism I have shown is adapted to form egg cases or trays with seven longitudinal strips and seven cross-strips assembled therein, making thirty-six cells. An enlargement of the mechanism would enable one to make cases of a greater number of cells. I have preferably shown mechanism for making cases of thirty-six cells.

In Fig. 11 I have shown the longitudinal strips formed with six equal spaces between the perforations and having the seventh space one-half the size of the equal spaces. This is accomplished by a pinion $d^{19}$, secured on the lower feed-roll shaft with six teeth of equal size and the seventh tooth formed one-half of the regular size. This pinion $d^{19}$ is connected to the disk-crank by a pawl $d^{20}$, as shown in Fig. 7, said pawl $d^{20}$ being spring-pressed against the pinion in such manner that the lower feed-roll will advance the longitudinal strip six equal spaces, but the seventh stroke of the disk-crank will advance the strip only one-half the distance before advanced. This variation is for the purpose of cutting the longitudinal strips, as hereinafter explained, at the seventh space.

The web, of strawboard or other material, for forming the cross-strip is fed into the machine from the bed $e$, and the feed-rollers $e'$ $e^2$, which are driven intermittently by a connecting-rod $h$ and ratchet-gear $h'$, similar to that described at $d^{15}$ and $d^{19}$, advance the web or cross-strip down in a vertical direction between the punching-dies $e^3$ and $e^4$. The movable punching-die $e^4$ is connected to the main operating-shaft by a connecting-rod $e^6$, jointed thereto, and the waste particles from the punching mechanism for the cross-strips is conveyed away through a channel $e^7$ by a belt $e^8$, passing over a pulley driven by bevel-gears $e^9$ $e^{10}$, which in turn are driven by the sprocket-chain $c$, as shown in Fig. 1.

The ledger knives or cutters $e^{12}$ on the punches or dies are so arranged that the web of strawboard after being punched is cut into cross-strips, the relative positions of the different parts being shown in Fig 4, wherein the longitudinal strip is shown in dotted lines. A spring-pressed plate $e^{13}$ (shown in Fig. 1) is for insuring the guiding of the cross-strips after cut from the web accurately and in proper alinement to the small feed and guiding rolls $e^{14}$ $e^{15}$.

As shown in Fig. 4, the ledger or cutter knives are placed sufficiently above the small feed-rolls $e^{14}$ $e^{15}$ so that the lower edge of the strip is gripped by the feed-rolls before the same is severed from the web. The small feed-rolls revolve continuously and rapidly, while the main feed-rolls for the web are moved intermittently. The small diameter of the feed-rolls permits them to revolve rapidly in contact with the web, but with just sufficient pull on the strip to hold the same tight while it is being cut and severed, but not sufficient to move it through the main feed-rolls before it is severed. This insures the web being held in proper position while being punched and severed, and the moment it is severed the feed-rolls, acting directly thereon, force it rapidly and positively into position in the openings or perforations in the longitudinal strips. The guide or feed roll $e^{15}$ is preferably formed with a longitudinal notch or groove, as shown at $e^{16}$ in Fig. 4. This notch assists in the gripping of the rolls on the severed strip and engages the upper edge of the cross-strip as it passes from the rolls and causes it to be not only moved downwardly, but slightly forwardly in the direction of the movement of the longitudinal strips as the roll revolves, thus carrying the strip free of the rolls and in a position to be engaged with the beater. This arrangement, it will be seen, enables the strip to be fed rapidly and positively into position while the feed-rolls for both the webs remain at rest, after which they are both intermittently moved forward to the new position at which the next strip is to be assembled.

There is arranged below and in front of the small feed-rolls a reciprocating plate $e^{17}$, supported at each end on arms $e^{18}$, which slide at their outer ends in bearings, said plate being normally spring-pressed, so as to stand immediately in front of a line passing between the feed-rolls, as shown in Fig. 4. This plate serves as an additional guide for preventing the upper edge of the partition fed through the rolls from being bent backwardly and also assists in freeing the upper edge of the partition from the rolls in case there is any tendency for the same to stick therein. A projection $e^{19}$ on the arm of the movable punching-die contacts with the projection $e^{20}$, extending upwardly from the rod $e^{18}$, so that when the movable die moves backwardly it forces the plate $e^{17}$ against the resistance of the spring in the same direction with the die, and thereby forces the cross-strip away from the small feed-rolls and keeps it in proper alinement until forced into place by the beaters hereinafter described.

A beater-plate $e^{21}$ is mounted on a rod or shaft $e^{22}$, held normally by a spring $e^{23}$ in the position shown in Fig. 3. The beater is pressed down by the projection $e^{19}$ on the arm of the movable die, which strikes against a lug $e^{24}$, extending upwardly in the path of said die. The parts are so constructed that the beater-plate will press the cross-strips securely into place immediately after they have been fed into position under said plate.

Cutting-shears $f$ are for cutting the longitudinal strips at the seventh or unequal space made by the punch-die, as heretofore explained. A blade $f'$ of said shears is held stationary, and the other blades $f^2$ are pivoted on a bar $f^3$ and connected at the lower ends by an arm $f^4$. This arm $f^4$ is connected to a pivoted arm $f^5$, the lower end of which has a roller $f^6$, which extends within a groove $f^7$ of a cam $f^8$. The cam $f^8$ is revolved by the disk-crank and connecting-rod, as hereinbefore explained. The construction of the pulley is such that when the friction-roller reaches the offset portion in the groove at $f^8$ the arm $f^5$ will drive the shear-blades $f'$ so as to cut the longitudinal strips, and the parts are so constructed that this cutting is accomplished after the seven cross-strips have been placed in position and the parts partly assembled. In this manner the cutting of the strawboard into definite and uniform sizes for cell-cases is accomplished in a very simple manner, and the parts are accurately measured and the sizes of the cases are uniform.

The respective blades which form the shears for the longitudinal strips are secured to an angle-bar $g$, which extends across the machine and is supported at each end on the main frame, said blades being secured to a vertical wing $g'$ of said angle-bar. A horizontal wing $g^2$ of this angle-bar carries a series of guiding-plates $g^3$ $g^4$, one pair of guides for each longitudinal strip. These guides are turned outwardly at the ends into which the longitudinal strips enter and are placed sufficiently close together to insure the longitudinal strips being held vertically and properly spaced, the stationary blade of each shear being located in line with the inner faces and adjacent to the end of the guiding-plate $g^4$. Immediately in front of these plates is a series of vertical guides $g^5$, curved forwardly over the tops of the knives at their upper ends and having spaces between them sufficient to permit the longitudinal strips to pass through. These vertical guides are all secured to a transverse bar $g^6$, which is bolted or otherwise removably secured to the angle-bar $g$. These vertical guides insure the transverse partitions being fed directly into the slots in the longitudinal strips and at proper space position in front of the cutting-shears. By having the guides secured to the transverse bar $g^6$ they may be removed at any time for repair or other purpose, and the cutting-knives and the guides for the longitudinal strips being all secured on the transverse bar $g$ a very compact arrangement of the knives and guides is secured and one which permits them to be readily removed at any time for sharpening or for other purpose.

It should be noted that the beater-plate $e^{21}$ extends across the machine and above the longitudinal strips and is supported at each end by the arms $e^{25}$, which are rigidly secured to the shaft $e^{22}$. The lug or projection $e^{24}$ is also secured rigidly to the shaft $e^{22}$ and is preferably formed with an extending arm or tail $e^{26}$, which extends outwardly from the shaft in the opposite direction from the beater-arms $e^{25}$, and to this arm or tail is secured the spring $e^{23}$, which serves to hold the beater in its normal position above the transverse strips. As the cross-head carrying the punches is reciprocated the lug $e^{19}$ thereon contacts with the projection $e^{24}$, and thus oscillates the shaft and gives the beater a quick downward movement against the transverse strips or partitions, forcing them quickly and positively into position, the beater being held in this position so long as the cross-head carrying the movable dies is in its forward position. As the cross-head moves backwardly the beater is released and the lug $e^{19}$ contacts with the projection $e^{20}$ on the rod $e^{18}$, which carries the movable plate $e^{17}$, the motion being timed so that this operation takes place just as the longitudinal strips are moving forward, thus insuring the upper projecting end of the transverse partition being moved forward with the longitudinal strips and being released from the feeding-rolls $e^{14}$ $e^{15}$.

For the purpose of insuring the interlocking of the upper and lower strips when the strips are flattened for the purpose of shipping I have shown the perforations in the upper strip of a peculiar shape. It is to be understood that after the strips are assembled by my machine it is necessary to ship or transport them to the consumer, and it is desirable to construct the strips so that they cannot readily be disconnected during shipping or when being put into use. It is usual in shipping or transporting these cases to have them flattened out in order to economize space. It is therefore very important to prevent them from being readily disconnected.

I have shown the upper strip formed with a perforation having a flap $a'$. The inner end of said flap touches the opposite side of the opening, so as to form a lock with the perforation in the lower strip, as shown in Fig. 13. This perforation in the upper strip is formed so that none of the material or approximately none of the material is removed or cut out at the point $a^2$. By this construction when the strips are flattened they will still be locked in their assembled position.

Having thus described my invention, I claim—

1. The combination with feeding and slotting devices for the longitudinal and cross strips, severing devices for the cross-strips and shears adapted to sever said longitudinal strips when a predetermined number of said cross-strips have been fed, of vertical guides in front of and extending forwardly over the tops of said shears to guide the cross-strips, said guides being spaced apart to form guides for the longitudinal strips, substantially as specified.

2. The combination with feeding and slotting devices for the longitudinal and cross strips, severing devices for the cross-strips and vertically-extending shears adapted to sever the longitudinal strips when a predetermined number of the cross-strips have been fed, of horizontally-extending guides having flaring mouths adapted to receive said longitudinal strips and pass same to said shears, and vertical guides for the cross-strips, said last-named guides being spaced apart to pass and guide the longitudinal strips from said shears, substantially as specified.

3. The combination with the feeding and slotting devices for the longitudinal and cross strips, and severing devices for the cross-strips, of a series of pairs of shears, one pair for each longitudinal strip, each pair of shears consisting of a stationary blade and a movable blade pivoted thereto, a bar to which each of said movable blades is pivoted and means to move said bar whereby each of said movable blades is simultaneously turned upon its pivot to sever the longitudinal strips when a predetermined number of the cross-strips have been fed.

4. The combination with the feeding and slotting devices for the longitudinal and cross strips, and severing devices for the cross-strips, of a series of pairs of shears, one pair for each longitudinal strip, horizontally-extending guides having flaring mouths adapted to receive and pass said longitudinal strips to said shears, vertical guides in front of and extending forwardly over the tops of said shears to guide the cross-strips, said last-named guides being spaced apart to pass and guide said longitudinal strips from said shears, each pair of said shears consisting of a stationary blade and a movable blade pivoted thereto, a bar to which each of said movable blades is pivoted, a cam having connections to said bar adapted to move said bar, whereby each of said movable blades is simultaneously turned upon its pivot to sever the longitudinal strips when a predetermined number of the cross-strips have been fed.

5. In an egg-case machine, the combination of feeding, cutting and punching mechanism for the web of longitudinal strips of strawboard or other suitable material, mechanism for cutting the longitudinal strips to proper length, feeding, punching and cutting mechanism for the web of cross-strips formed of strawboard or other suitable material, a pair of guiding and feed rolls for the cross-strips so located that they will feed the cross-strips after same are completely severed from the web.

6. In an egg-case machine, the combination, with mechanism for feeding, cutting and punching longitudinal strips from a web of strawboard or other suitable material, mechanism for feeding, cutting and punching cross-strips from a web of strawboard or other suitable material, means for cutting the cross-strips therefrom, a pair of guide-rolls for feeding the cross-strips, one of said rolls being notched so as to grip the said cross-strips and insure the same being readily released from said rolls, for the purpose specified.

7. In an egg-case machine, the combination of mechanism for feeding, punching and cutting a web of strawboard into longitudinal strips, means for cutting the longitudinal strips to proper lengths, mechanism for feeding, cutting and punching a web of strawboard or other suitable material for cross-strips, means for cutting the cross-strips therefrom, a pair of feed or guide rolls for said cross-strips adapted to feed the cross-strips after the same are cut from the web, and means on said feed-rolls for gripping the lower edge of said cross-strips and for permitting the upper edge of same to be moved freely from the rolls, and mechanism for assembling said cross-strips in perfect alinement with the perforations in said longitudinal strips.

8. A machine for making egg-cases, rotary cutters, punching and feeding devices for the web of longitudinal strips, with feeding, cutting and punching devices for the web of cross-strips, springs for holding the upper rotary cutter normally out of contact with the lower cutter, and means for raising and lowering said upper rotary cutter for the purpose specified.

9. In an egg-case machine, the combination of feeding, cutting and punching mechanism for the webs of longitudinal strips, feeding, cutting and punching mechanism for the webs of the cross-strips, intermittently-moving feeding-rolls for each of said webs, said feeding-rolls being adapted to feed said webs at right angles to each other, and a pair of continuously-rotating auxiliary feeding-rolls for the cross-strips, said rolls being located below the punching and shearing mechanism and adapted to feed the cross-strips into the longitudinal strips as soon as the same are severed and while both of the webs on which the strips are formed remain at rest, substantially as and for the purpose specified.

10. In a machine such as described and in combination with the strip-forming mechanism arranged to feed the respective strips at right angles to each other, of a pair of continuously-rotating feeding-rolls arranged across and above the longitudinal strips and in line with the cross-strips and adapted to engage said cross-strips and force them into engagement with the longitudinal strips as soon as said cross-strips are severed from the web, substantially as specified.

11. The combination with the strip-forming mechanism for the longitudinal strips and intermittently-rotating feed-rolls for feeding the web at right angles to said longitudinal strips, a reciprocating cross-head carrying punching and cutting mechanism to form said cross-strips, a pair of auxiliary feed-rolls arranged below said cutting and punching device adapted to engage said web below the cross-head, and means for rotating said auxiliary feed-rolls so that the same will carry the cross-strip into engagement with the longitudinal strip as soon as said cross-strip is severed and while the main feed-rolls remain at rest, substantially as and for the purpose specified.

12. The combination of the main feed-rolls for the cross-web and a pair of auxiliary rolls for the cross-strips, a reciprocating head for punching and shearing said web to form said strips, said head being located between said main and auxiliary rolls, said main rolls being adapted to be operated intermittently and said auxiliary rolls continuously, substantially as and for the purpose specified.

13. The combination with the strip-forming mechanism for the longitudinal and transverse strips, as described, of a pair of continuously-rotating feeding-rolls for said cross-strips, one of said rolls having a longitudinal groove, substantially as and for the purpose specified.

14. The combination with the strip-forming mechanism for the longitudinal and transverse strips, of the reciprocating cross-head adapted to punch and shear the cross-strips, of a continuous web, a yielding plate located above and in close proximity to the shearing-knife for said strips, substantially as and for the purpose specified.

15. The combination with the intermittently-rotating main feeding-rolls and the continuously-revolving auxiliary feeding-rolls for the cross-strips, of a reciprocating head carrying punching devices and a movable shearing-blade, a stationary knife or blade below said punching devices, and a yielding plate adjacent to said stationary knife adapted to normally stand in line with the respective pairs of feeding-rolls, said plate being adapted to yield along said knife when the strip is being severed and to be moved forwardly in its guiding position as soon as the knife recedes to its normal position, substantially as and for the purpose specified.

16. The combination with the punching and cutting mechanism for the cross-strips and the auxiliary feeding-rolls for the same, of a reciprocating plate below said rolls and means for moving said plate forward after the cross-strips have passed through said auxiliary rolls, substantially as and for the purpose specified.

17. The combination with the continuously-rotating auxiliary feeding-rolls, one of said rolls being provided with a longitudinal groove, of the movable plate arranged below said feeding-rolls, and means for moving said plate backward after the cross-strip has been fed through said auxiliary feeding-rolls, substantially as specified.

18. The combination with the reciprocating cross-head carrying the punching and shearing devices for the transverse strips, of a transverse shaft having outwardly-extending arms and a beater-plate at the extremities of said arms, a projecting arm on said shaft, a spring connected to said arm, and a contacting lug or projection on said reciprocating head whereby said beater is forced downwardly and held in a downward position during the forward movement of said cross-head, substantially as and for the purpose specified.

19. The combination with the reciprocating cross-head carrying the punching and cutting devices for the cross-strips, the spring-pressed plate arranged adjacent to said cutting devices, the auxiliary feeding-rolls below the cutting devices, the transverse bar or plate below said feeding-rolls, a beater-plate in front of said auxiliary feeding-rolls, and a projection on said reciprocating cross-head adapted by one movement of the cross-head to operate the beating device and by the return movement to operate said transverse bar to insure the discharge of said cross-strips and forcing them firmly into position, substantially as and for the purpose specified.

In testimony whereof I have hereunto set my hand this 29th day of July, A. D. 1902.

WILLIAM B. SHEPERD.

Witnesses:
CHAS. I. WELCH,
MORRIS ARBOGAST.